United States Patent
Filipovic

(10) Patent No.: US 7,106,816 B2
(45) Date of Patent: Sep. 12, 2006

(54) SUPPORTING MULTIPLE WIRELESS PROTOCOLS IN A WIRELESS DEVICE

(75) Inventor: Daniel F. Filipovic, Solana Beach, CA (US)

(73) Assignee: Qualcomm Incorporated, San Diego, CA (US)

( * ) Notice: Subject to any disclaimer, the term of this patent is extended or adjusted under 35 U.S.C. 154(b) by 38 days.

(21) Appl. No.: 10/323,011

(22) Filed: Dec. 18, 2002

(65) Prior Publication Data

US 2004/0120421 A1    Jun. 24, 2004

(51) Int. Cl.
    *H04B 1/10*    (2006.01)
(52) U.S. Cl. .................. 375/349; 375/340; 375/350
(58) Field of Classification Search ............... 375/316, 375/340, 346, 349, 350
    See application file for complete search history.

(56) References Cited

U.S. PATENT DOCUMENTS

| | | | | |
|---|---|---|---|---|
| 5,392,460 | A * | 2/1995 | Mattila et al. | 455/76 |
| 5,617,135 | A * | 4/1997 | Noda et al. | 348/14.12 |
| 6,282,184 | B1 * | 8/2001 | Lehman et al. | 370/342 |
| 6,385,262 | B1 | 5/2002 | Gustafsson et al. | 375/350 |
| 2002/0132597 | A1 | 9/2002 | Peterzell et al. | |
| 2003/0081706 | A1 * | 5/2003 | Ciccarelli et al. | 375/350 |
| 2003/0207679 | A1 * | 11/2003 | Kaczynski et al. | 455/339 |
| 2004/0003844 | A1 | 1/2004 | Yamada | |
| 2004/0152418 | A1 * | 8/2004 | Sinha et al. | 455/42 |

FOREIGN PATENT DOCUMENTS

| | | |
|---|---|---|
| EP | 1168647 | 1/2002 |
| WO | 0227953 | 4/2002 |
| WO | 02075942 | 9/2002 |

* cited by examiner

*Primary Examiner*—Jay K. Patel
*Assistant Examiner*—David B. Lugo
(74) *Attorney, Agent, or Firm*—Philip Wadsworth; Charles D. Brown; Howard H. Seo

(57) ABSTRACT

This disclosure is directed toward a wireless device configured to support a plurality of wireless protocols. More specifically, the wireless device includes signal processing components that can be used in more than one communication mode. Accordingly, distinct components conventionally used in a wireless device that supports a plurality of protocols may be eliminated in favor of one or more common components that can be used in the different communication modes. In one example, an analog filter is used to filter baseband signals associated with a first protocol and a second protocol. A digital filter can then be used to perform additional filtering on digital baseband signals associated with the second protocol. By using a common analog filter for analog filtering of baseband signals associated with different protocols, the architecture and design of a wireless device can be simplified.

21 Claims, 7 Drawing Sheets

SUPPORTING MULTIPLE WIRELESS PROTOCOLS IN A WIRELESS DEVICE

FIELD

This disclosure relates to wireless communication and, more particularly, to wireless devices that support multiple wireless protocols.

BACKGROUND

Wireless networks allow computing devices to share information and resources via wireless communications. Examples of computing devices used in wireless networks include laptop or desktop computers, personal digital assistants (PDAs), mobile phones such as cellular radiotelephones and satellite radiotelephones, data terminals, data collection devices, personal digital assistants (PDAs), wireless appliances, direct two-way communication devices, and other portable and non-portable computing devices. One broad family of standards developed to facilitate wireless networking is set forth in IEEE 802.11. The original IEEE 802.11 standard provides data transfer rates of 1–2 Megabits per second (Mbps) in a 2.4–2.483 gigahertz (GHz) frequency band (hereafter the 2.4 GHz band). However, a number of extensions to the original IEEE 802.11 standard have been developed in an effort to increase data transfer rates.

The IEEE 802.11b standard (sometimes referred to as 802.11 wireless fidelity or 802.11 Wi-Fi) is an extension of the IEEE 802.11 standard that provides 11 Mbps transmission (with a fallback to 5.5, 2.0 and 1.0 Mbps) in the 2.4 GHz band. The IEEE 802.11b standard utilizes binary phase shift keying (BPSK) for 1.0 Mbps transmission and quadrature phase shift keying (QPSK) for 2.0, 5.5 and 11.0 Mbps transmission. Complementary code keying (CCK) techniques are also employed by IEEE 802.11b in order to achieve multi-channel operation in the 2.4 GHz band for the 5.0 and 11.0 Mbps transmission rates.

The IEEE 802.11g standard is another extension of the IEEE 802.11 standard. The IEEE 802.11g standard utilizes orthogonal frequency division multiplexing (OFDM) in the 2.4 GHz frequency band to provide data transmission at rates up to 54 Mbps. The IEEE 802.11a standard is an extension of IEEE 802.11 standard that utilizes OFDM in a 5 GHz frequency band to provide data transmission at rates up to 54 Mbps. These and other wireless networks have been developed. Additional extensions to the IEEE 802.11 standard, as well as other WLAN standards will likely emerge in the future.

Wireless communication devices may also support other communication standards, such as standards commonly used for voice communications. The voice communication standards may be based on one or more of a variety of modulation techniques, such as frequency division multiple access (FDMA), time division multiple access (TDMA), and various spread spectrum techniques. One common spread spectrum technique used in wireless voice communication is code division multiple access (CDMA) signal modulation. In CDMA, multiple communications are simultaneously transmitted over a spread spectrum radio frequency (RF) signal, and orthogonal codes are used by respective wireless devices to obtain desired communications from the spread spectrum signal. Other modulation and encoding techniques have also been developed, such as space-time techniques that exploit multiple antenna configurations.

Sometimes it is desirable to support two or more wireless protocols in a wireless device. In order to support a plurality of wireless protocols, conventional wireless devices typically include separate hardware, software, and/or firmware for handing signals received according to the different protocols. For example, different receivers, different analog filters, different digital filters, and different demodulators are commonly implemented in a wireless device in order to allow the wireless device to support the different protocols.

SUMMARY

In general, this disclosure is directed to a wireless device configured to support multiple wireless protocols. More specifically, the wireless device includes signal processing components that can be used in different communication modes that correspond to different wireless protocols. Accordingly, distinct components conventionally used in a wireless device that supports a plurality of protocols may be eliminated in favor of one or more common components that can be used in the communication modes associated with the different wireless protocols. In this manner, the architecture and design of a wireless device can be simplified. For example, as outlined in greater detail below, a common analog filter can be used for a number of different wireless protocols, avoiding the need for distinct analog filters for each protocol.

In one embodiment, this disclosure describes a method comprising filtering different analog signals modulated according to different wireless protocols using a common analog filter of a wireless device, and selectively filtering digital signals generated from only some of the analog signals using a digital filter. The selective filtering may be based on wireless protocols associated with respective signals. The method may be executed in a wireless device.

In another embodiment, this disclosure describes a wireless device. For example, the wireless device may include one or more receivers to receive different wireless signals modulated according to a plurality of different wireless protocols and an analog filter to filter analog baseband signals associated with the different wireless signals. The wireless device may also include an analog-to-digital converter to convert the analog baseband signals to digital baseband signals, and a digital filter to selectively filter some of the digital baseband signals based on a given wireless protocol associated with a given baseband signal. In addition, the wireless device may include one or more demodulators to demodulate the digital baseband signals.

Various embodiments may be implemented in a wireless device in software, hardware, firmware, or any combination thereof. If implemented in software, this disclosure may be directed to a computer readable medium comprising machine readable instructions that can be executed in a wireless device to carry out one or more of the techniques described herein. Additional details of various embodiments are set forth in the accompanying drawings and the description below. Other features, objects and advantages will become apparent from the description and drawings, and from the claims.

DETAILED DESCRIPTION

Figure 1:
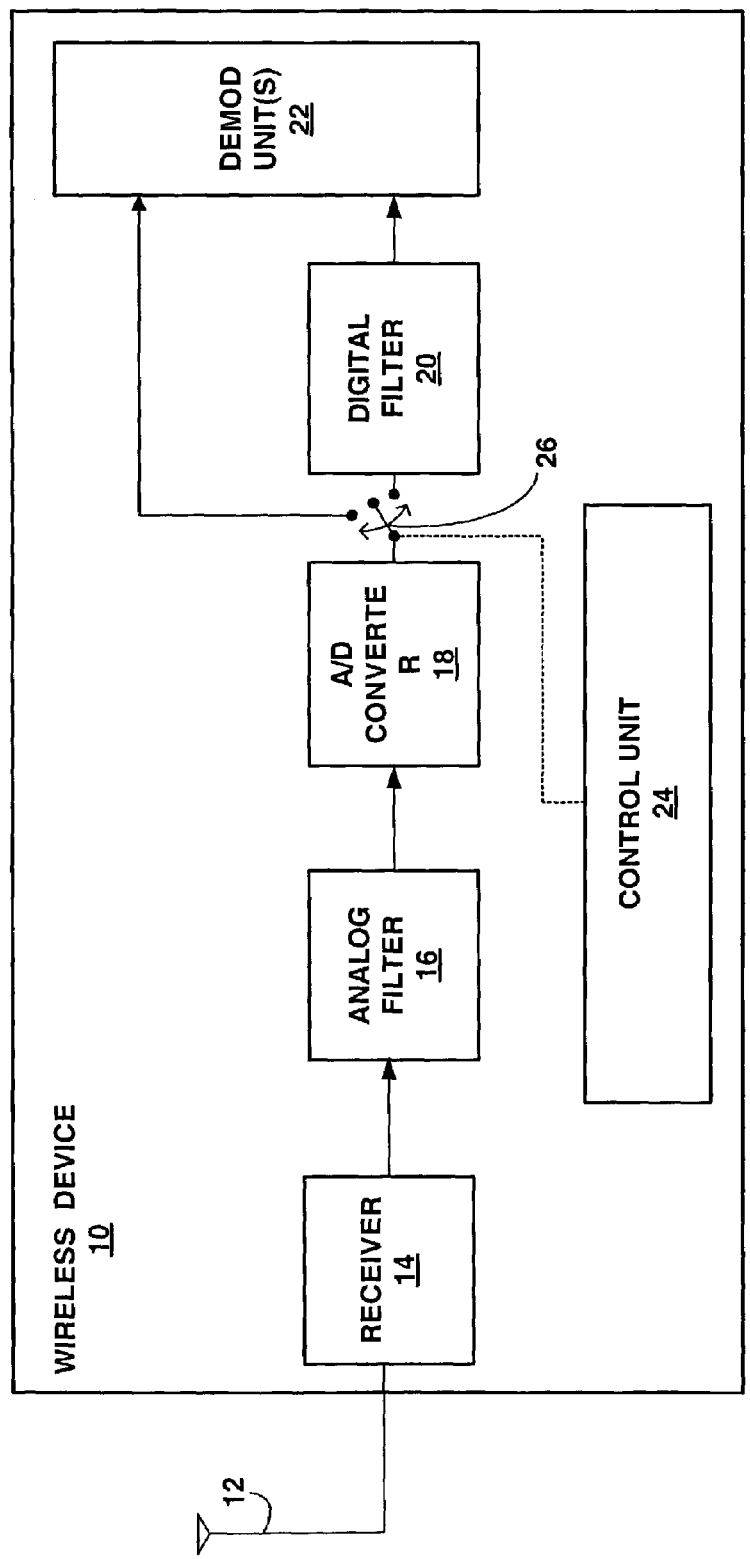
FIG. 1 is a block diagram of a wireless device according to one embodiment.

This disclosure is directed to a wireless device configured to support a plurality of wireless protocols. More specifically, the wireless device includes signal processing components that can be used in different communication modes, i.e., modes of operation in which the device is configured for different communication protocols. Accordingly, distinct components conventionally used in a wireless device that supports a plurality of protocols may be eliminated in favor of one or more common components that can be used in the communication modes associated with the different wireless protocols.

In one example, a wireless device is designed with a common analog filter used for a plurality of different communication modes. Accordingly, the need for separate analog filters in order to support different protocols can be eliminated. Instead, a common analog filter can be used to filter baseband signals associated with a plurality of wireless protocols. A digital filter can be used on a selective basis to further condition some of the digital baseband signals. For example, the digital filter may be used to filter digital baseband signals associated with one of the communication protocols. For some protocols, the analog filter performs substantially all the filtering needed to facilitate effective demodulation. For other protocols, the analog filter performs some but not all of the filtering. In the latter case, the digital filter can be invoked to perform the additional filtering needed for effective demodulation.

In a specific example outlined in greater detail below, a wireless device is configured to support a number of IEEE 802.11 standards. For example, the IEEE 802.11a standard, the IEEE 802.11b standard, and the IEEE 802.11g standard can be supported in a wireless device using various common components to reduce complexity of the implementation. In particular, a common receiver may be used for IEEE 802.11a and IEEE 802.11b since both standards operate in the 2.4 GHz band. A common analog filter may be used for all three standards, and a digital filter may be invoked for the IEEE 802.11b standard.

The analog filter may be a band pass filter designed to pass a particular range of frequencies associated with baseband signals in substantial conformance with either the IEEE 802.11a or IEEE 802.11g standard. For the IEEE 802.11a and IEEE 802.11g standards, the baseband signals are substantially identical since similar multi-carrier, OFDM modulation techniques are used for both IEEE 802.11a and IEEE 802.11g. In general, the difference between IEEE 802.11a and IEEE 802.11g is the carrier frequency, which is in a 5 GHz band for IEEE 802.11a and a 2.4 GHz band for IEEE 802.11g.

The IEEE 802.11b standard uses communication of direct sequence spread spectrum signals. The baseband signals for IEEE 802.11b are different than those of IEEE 802.11a and IEEE 802.11g, but generally fall within the pass band of an analog filter designed for IEEE 802.11a and IEEE 802.11g baseband signals. For this reason, a digital filter can be invoked for IEEE 802.11b, in addition to the common analog filter, in order to condition a digital baseband signal generated from an IEEE 802.11b analog baseband signal.

FIG. 1 is a block diagram of an exemplary wireless device 10. Wireless device 10 may be any portable computing device configured to support wireless networking or wireless communication protocols. For example, wireless device 10 may comprise a desktop or portable computer operating in a Windows™, Macintosh™, Unix, or Linux environment, a personal digital assistant (PDA) based on the Palm™, Windows CE, or similar operating system environments for small portable devices, or other wireless device such as a mobile radiotelephone, an interactive television, a wireless data terminal, a wireless data collection device, an Internet kiosk, a network-ready appliance for the home environment, a wireless server, a direct two-way communication device, or the like. In addition, wireless device 10 may correspond to a wireless network access point that receives signals from a wireless computing device.

As illustrated in FIG. 1, wireless device 10 includes an antenna 12 coupled to a receiver 14, an analog filter 16 coupled to receiver 14, and an analog-to-digital (A/D) converter 18 coupled to the analog filter 16. Output of A/D converter 18 can be sent directly to one or more demodulation units 22, or alternatively, output of A/D converter 18 may be sent through a digital filter 20 prior to being sent to demodulation unit(s) 22. A control unit 24 may send control signals 25 to selectively enable or disable digital filter 20 based on the current wireless protocol being supported.

For example, control unit 24 may activate or deactivate a switch 26 to enable or disable digital filter 20. In that case, the enabling or disabling of digital filter would comprise defining the signal path through digital logic. In other cases, however, digital filter 20 is software implemented, in which case, the enabling or disabling of digital filter 20 would comprise invoking or avoiding a software filtering routine. Accordingly, switch 26 may be illustrative of a logic switch for changing a signal path through digital hardware or alternatively, a software decision about whether to invoke a digital filtering software routine. In either case, control unit 24 enables or disables digital filter 20. Control unit 24 may comprise hardware, software, firmware, or any combination thereof.

Selective activation of digital filter 20 can allow analog filter 16 to be used for a plurality of wireless protocols. For example, analog filter 16 may be used to filter a first analog baseband signal modulated according to a first wireless protocol, and the same analog filter 16 may be used to filter a second analog baseband signal modulated according to a second wireless protocol. Digital filter 20 may be enabled to filter a digital baseband signal corresponding to the second analog baseband signal, but may be disabled if the current protocol corresponds to that of the first analog baseband signal. In this manner, selective activation of digital filter 20 allows analog filter 16 to be used as a common analog filter for a plurality of protocols and avoids the need for additional analog filters. If additional filtering is required for a particular protocol, the incoming signal is applied to digital filter 20 after passing through analog filter 16 and A/D converter 18.

If desired, additional digital filters may also be used for the first wireless protocol, or additional digital filters may be used in order to allow wireless device to support other protocols. In any event, the use of a common analog filter 16 can greatly simplify the implementation of multiple protocols in a wireless device 10. In addition, a common analog filter may reduce power consumption, reduce the size and complexity of wireless device 10, and reduce costs associated with production of wireless device 10.

Receiver 14 conditions a received wireless signal such as by scaling and downconverting the received wireless signal to a baseband frequency. More specifically, receiver 14 may receive wireless RF signals, such as signals modulated according to a modulation scheme used for wireless networking, such as the BPSK or QPSK modulation schemes typically implemented by devices compliant with the IEEE 802.11b wireless networking standard or the OFDM modulation scheme typically implemented by devices compliant with the IEEE 802.11g or IEEE 802.11a wireless networking standards. The received information may take the form of data packets encoded according to the modulation scheme used.

Receiver 14 conditions the RF signals, such as by amplifying or attenuating the RF signals and mixing the signals down to baseband. Receiver 14 may implement a zero intermediate frequency (zero IF) architecture in which the received signal is mixed directly into an analog baseband signal without first being mixed to an intermediate frequency (IF) signal. The techniques described below, however, are not necessarily limited to zero IF implementations, but may also be used in implementations having one or more IF sections including heterodyne architectures.

Analog filter 16 receives analog baseband signals from receiver 14 and filters the analog baseband signals. Specifically, analog filter 16 can be viewed as a common filter that filters analog baseband signals associated with a plurality of different wireless protocols. By way of example, analog filter 16 may comprise a bandpass filter with a pass band that conforms to one of the wireless protocols. Such a pass band may also pass baseband signals associated with other wireless protocols, but the baseband signals of such other wireless protocols may require additional filtering. Accordingly, additional filtering can be performed by digital filter 20 by selectively enabling digital filter 20 when the additional filtering is needed.

A/D converter 18 receives filtered analog baseband signals from analog filter 16, and converts the analog baseband signals to digital baseband signals. At that point, the processing of the digital baseband signals is determined by control unit 24. In particular, control unit 24 controls the enabling and disabling of digital filter 20 based on a current wireless protocol. For example, control unit 24 may receive user input selecting a current wireless protocol, and can then enable or disable digital filter 20 depending on whether the selected wireless protocol requires digital filtering in addition to the analog filtering performed by analog filter 16. In some cases, additional digital filters may be implemented for various different protocols, and in other cases, digital filters may be implemented for every protocol. In any case, control unit 24 may selectively enable or disable one or more digital filters based on the selected protocol. In other embodiments, the selection of the current protocol may be based on measurements of a received signal rather than user input. In that case, control unit 24 may automatically enable or disable the digital filter when a protocol is identified based on a received signal.

As mentioned above, the enabling or disabling of digital filter 20 may comprise electronic switching of digital logic, or may comprise a software-based decision to invoke or not invoke a software-implemented digital filtering routine. Switch 26 conceptually illustrates either scenario. In other words, switch 26 can be viewed as a logic gate that enables or disables digital filter 20 if the filter is hardware implemented, or alternatively, switch 26 can be viewed as a software decision that enables or disables digital filter 20 if the filter is software implemented. In either case, control unit 24 selectively enables digital filter 20 based on a protocol currently being supported.

If digital filter 20 is enabled by control unit 24, then the output of A/D converter 18 is input to digital filter 20 for filtering. Then, the output of digital filter 20 can be sent to demodulation unit(s) 22 for demodulation and data extraction. If on the other hand, digital filter 20 is disabled, output of A/D converter 18 may be sent directly to demodulation unit(s) 22, without being filtered by digital filter 20. In this manner, selective enabling and disabling of digital filter 20 can allow a common analog filter 16 to be used with different wireless protocols, thereby avoiding the need for separate analog filters for each protocol.

Wireless device 10 may include various other components that are not illustrated in FIG. 1 for simplicity and clarity. For example, wireless device 10 may include a digital voltage gain amplifier (DVGA) that further conditions the digital baseband signals prior to demodulation, and may also include various automatic gain control (AGC) units to control the gain of the DVGA or the gain of one or more amplifiers of receiver 14. In addition, wireless device may include various other signal processing components such as DC removal units, power detectors, gain state selection units to provide discrete gain state adjustments to amplifiers and mixers of receiver 14, transmitters to transmit signals, duplexers to facilitate transmission and reception of signals via the same antenna 12, and other components known in the art.

The illustrated components of wireless device 10 may comprise separate components, or one or more of the illustrated components may reside on various integrated circuits. For example, one or more analog circuits may include receiver 14 and filter 16. One or more digital signal processors that execute software may form control unit 24, digital filter 20 and demodulation unit(s) 22. A/D converter 18 may form part of the analog circuitry, or may be formed with the DSP(s). Alternatively, A/D converter 18, or various other components may comprise discrete hardware components.

Figure 2:
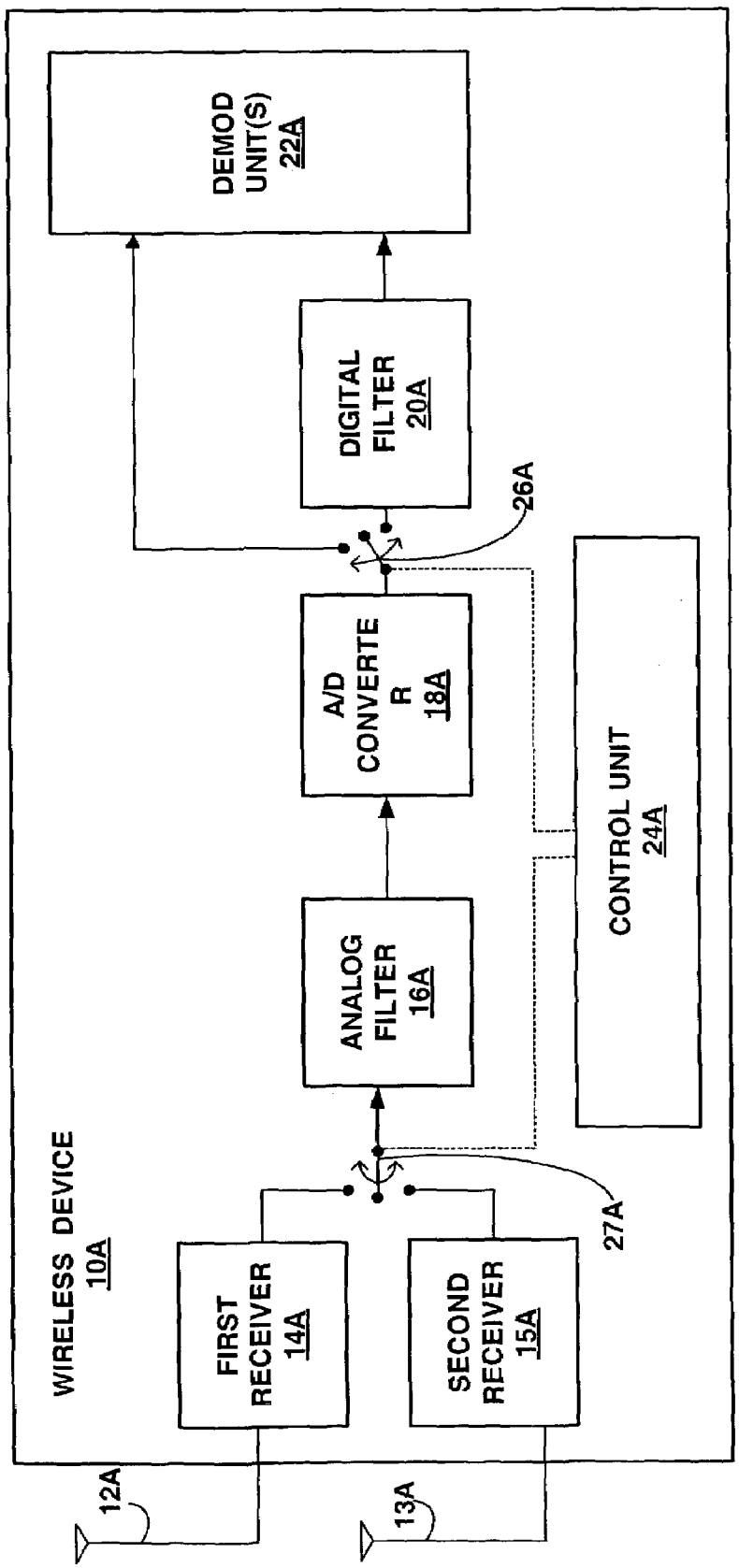
FIG. 2 is another block diagram of a wireless device according to an embodiment.

FIG. 2 is a block diagram illustrating in greater detail one implementation of a wireless device 10A according to an embodiment. In the example of FIG. 2, wireless device 10A includes two separate receivers 14A and 15A coupled respectively to two separate antennas 12A and 13A. Wireless device 10A may operate similarly to wireless device 10, in that control unit 24A selectively enables or disables digital filter 20A based on a selected wireless protocol. However, in addition to selectively enabling or disabling digital filter 20A based on a current wireless protocol, in wireless device 10A, control unit 24A also selectively enables one of receivers 14A, 15A based on the wireless protocol. In other words, selection of one wireless protocol may cause control unit 24A to enable first receiver 14A and selectively enable or disable digital filter 20A. Then, selection of another wireless protocol may cause control unit 24A to enable second receiver 15A and selectively enable or disable digital filter 20A. In this manner, selective enabling of receivers and digital filters can simplify implementations of a number of wireless protocols in a wireless device.

Switches 26A and 27A can be viewed as electronic switches that receive control signals from control unit 24 to facilitate the selective configuring of wireless device 10A. Alternatively, one or both of switches 26A and 27A may be software implemented, e.g., to configure wireless device to execute software routines consistent with the selected protocol. For example, as described above, if digital filter 20A is software implemented, then switch 26A would typically comprise a software-decision to either invoke or not invoke the digital filtering software routine. In any case, control unit 24A selectively enables one of receivers 14A, 15A, and selective enables or disables digital filter 20A consistent with a selected protocol.

Figure 3A:
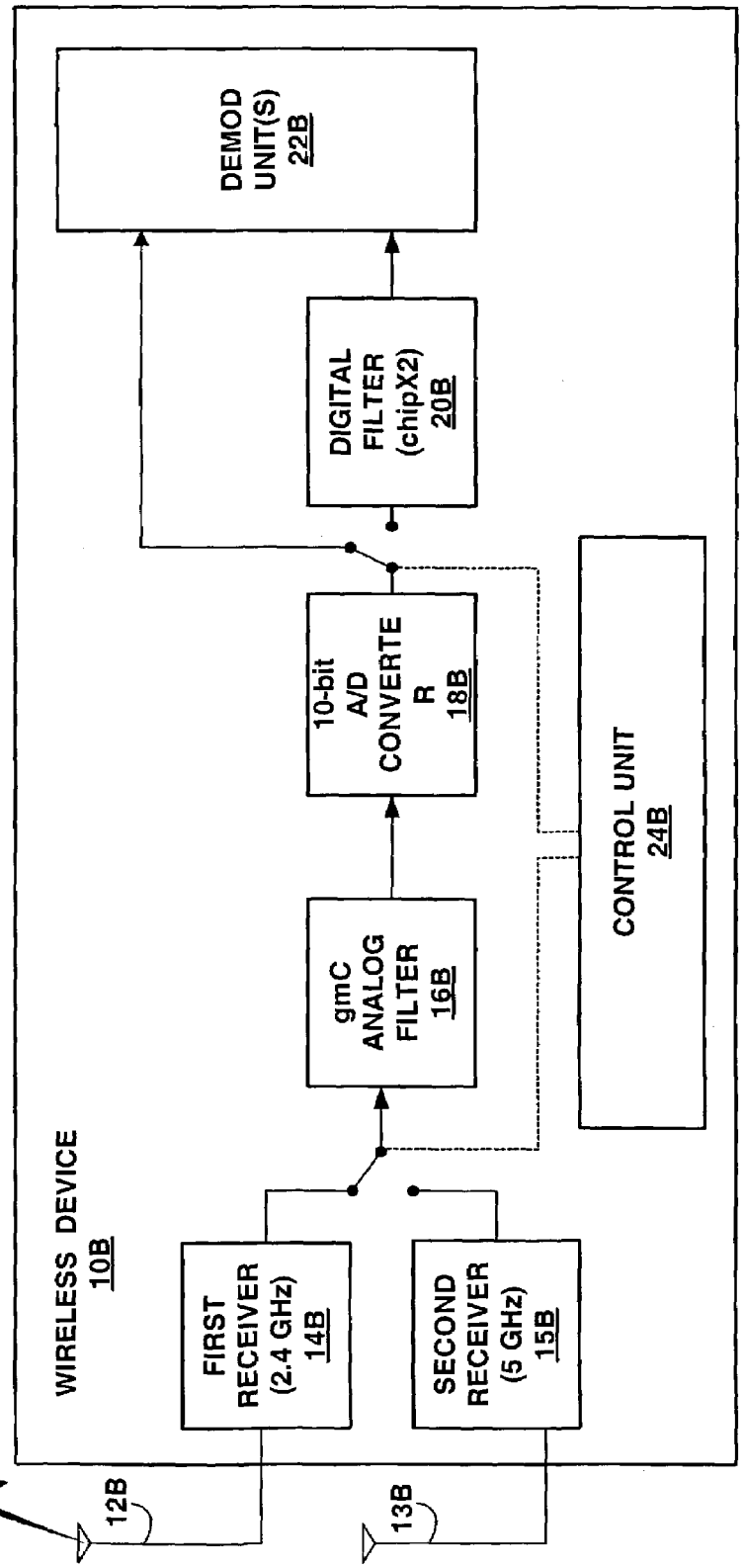
FIGS. 3A–3C are exemplary block diagrams of a wireless device according to an embodiment in which the wireless device is configured to support the 802.11a standard, the 802.11b standard, and the 802.11g standard.
Figure 3B:
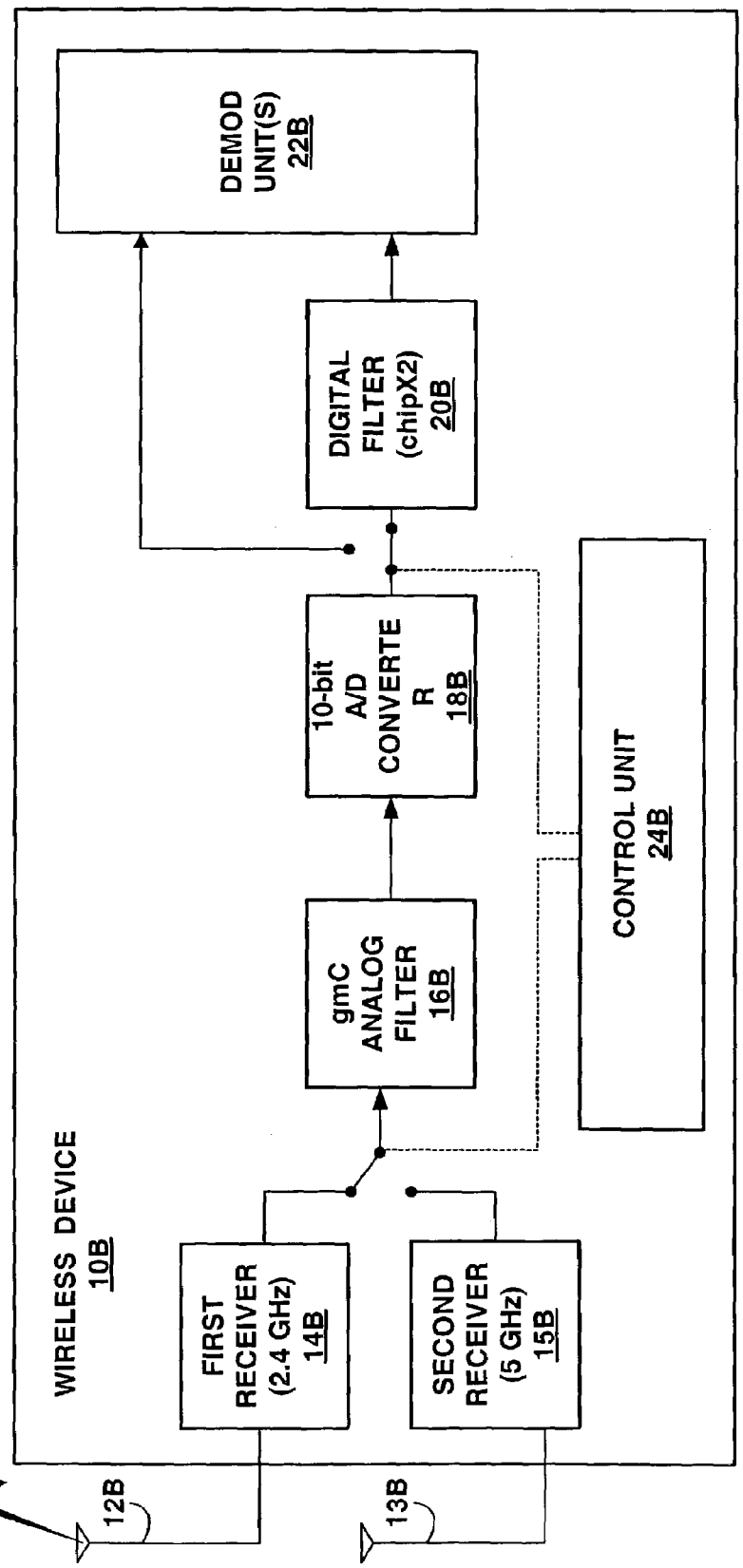
Figure 3C:
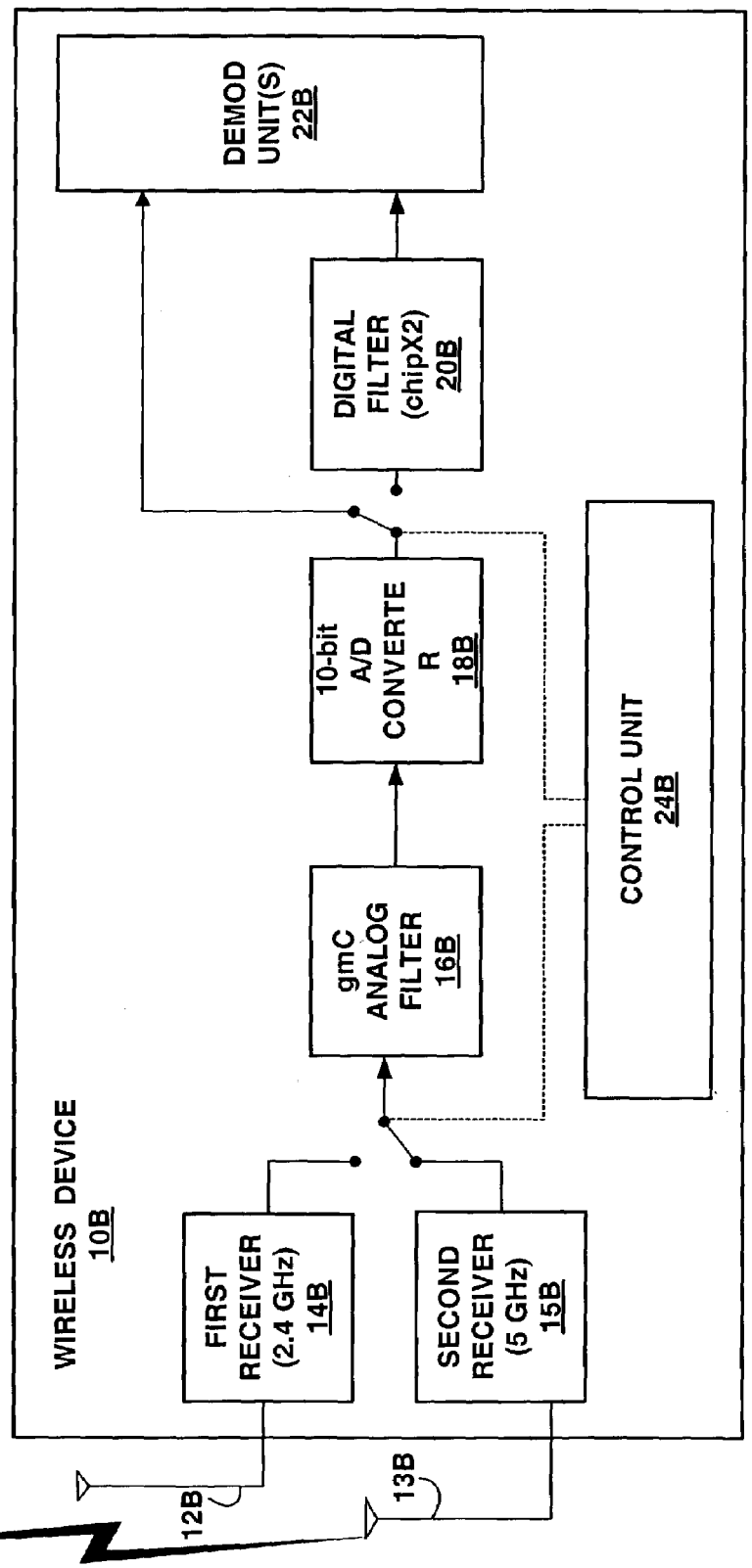

FIGS. 3A–3C are exemplary block diagrams of a wireless device according to an embodiment in which the wireless device is configured to support the IEEE 802.11a standard, the IEEE 802.11b standard, and the IEEE 802.11g standard. In particular, FIGS. 3A–3C illustrate a more specific embodiment of a wireless device like that illustrated in FIG. 2, that can perform selective enabling of receivers and digital filters in order to support the plurality of wireless protocols. More specifically, as illustrated in FIGS. 3A–3C, the architecture may support at least three different wireless protocols with two receivers, one analog filter, and one digital filter.

FIG. 3A illustrates wireless device 10B after being configured for communication according to the IEEE 802.11g wireless networking standard. In the example of FIG. 3A, control unit 24B configures wireless device 10B for communication according to the IEEE 802.11g standard by enabling first receiver 14B and disabling digital filter 20B. As mentioned above, this enabling may be performed in response to user input defining IEEE 802.11g as the communication mode, or alternatively, may be performed automatically upon identifying that an IEEE 802.11g signal has been received.

As illustrated in FIG. 3A, first receiver 14B may comprise a 2.4 GHz receiver coupled to antenna 12B. By way of example, first receiver 14B may comprise a zero IF architecture that scales a received IEEE 802.11g signal and downconverts the received IEEE 802.11g signal to baseband. At baseband, the IEEE 802.11g signal comprises an OFDM signal having channels that span a frequency band of approximately +9 MHz to –9 MHz. By way of example, analog filter 16B may comprise a transconductance-capacitor (gmC) filter 16B having a passband that substantially conforms with the IEEE 802.11g standard. As one example, gmC analog filter 16B may have a transfer function that is flat for in channel IEEE 802.11b, IEEE 802.11g and IEEE 802.11a signals, i.e., signals between approximately –9 to +9 MHz. The transfer function of gmC analog filter 16B may attenuate jammer signals outside the –9 to +9 MHz in substantial conformance with IEEE 802.11g and IEEE 802.11a specifications.

Filtering is important for ensuring that a desired signal, e.g., an IEEE 802.11 signal can be identified for demodulation, while jammer signals can be ignored and not demodulated. Jammer signals refer to noise signals that do not correspond to information signals to be demodulated. Jammer signals may be signals sent from other devices operating according to protocols not supported by the wireless device, signals emitted from microwave ovens, cordless telephones, other electromagnetic emitting devices, or the like. In any case, effective filtering is important for distinguishing information signals to be demodulated from jammer signals to be ignored.

Referring again to FIG. 3A, after filtering, the IEEE 802.11g analog baseband signal is sent to an A/D converter 18B, which may comprise a 10-bit A/D converter, a sigma-delta A/D converter, or the like. A/D converter 18B converts the IEEE 802.11g baseband signal to an IEEE 802.11g digital baseband signal and sends the digital baseband signal directly to demodulation unit(s) 22B for demodulation. As mentioned above, a DVGA may also be implemented to scale the digital baseband signal prior to demodulation. Importantly, however, because digital filter 20B is disabled, filtering of the digital baseband signal that corresponds to IEEE 802.11g are avoided.

FIG. 3B illustrates the same wireless device 10B illustrated in FIG. 3A. However, in FIG. 3B, wireless device 10B is configured for communication according to the IEEE 802.11b wireless networking standard. In that case, control unit 24B configures wireless device 10B for communication according to the IEEE 802.11b standard by enabling first receiver 14B and enabling digital filter 20B. Again, this enabling may be performed in response to user input defining IEEE 802.11b as the communication mode, or alternatively, may be performed automatically upon identifying that an IEEE 802.11b signal has been received.

First receiver 14B scales a received IEEE 802.11b signal and downconverts the received IEEE 802.11g signal to baseband. At baseband, the IEEE 802.11b baseband signal comprises I- and Q-baseband components of the RF signal as is well known in the art. The I-component refers to the in-phase component of the complex waveform, whereas the Q-component refers to the quadrature-phase component of the complex waveform. In both cases, first receiver 14B passes the analog baseband signal for the respective I- or Q-components of the complex waveform analog filter 16B.

After filtering by the common analog filter 16B, the I- and Q-components are sampled by A/D converter 18B. At that point, the baseband signal in the form of I- and Q-baseband components may take the form of streams of 10-bit samples. Again, analog filter 16B may comprise a transconductance-capacitor (gmC) filter 16B having a passband that substantially conforms with the IEEE 802.11g standard. Such a filter, however, will also pass baseband signals modulated according to the IEEE 802.11b standard. Other types of analog filters may also be used instead of a gmC filter.

Additional filtering for IEEE 802.11b is performed by digital filter 20B. Accordingly, after A/D converter 18B has converted the IEEE 802.11b analog baseband signal to an 802.11b digital baseband signal, the digital baseband signal is sent to digital filter 20B for further filtering. Digital filter 20B may be designed with an understanding that the IEEE 802.11b baseband signals will have already been filtered by analog filter 16B, which defines a pass band for IEEE 802.11g. For this reason, digital filter 20B can be simplified to perform residual filtering necessary to properly condition an IEEE 802.11b signal that was already conditioned by analog filter 16B.

By way of example, digital filter 20B may comprise a hardware or software implemented filter having a pass band that substantially conforms with the IEEE 802.11b standard. Digital filter may be clocked at a rate corresponding to a size of a desired pass band for IEEE 802.11b, such as at a chip rate of chipX2 if an 11 MHz DSP is used to implement digital filter 20B. In that case, digital filter would be clocked at approximately 22 MHz. As one example, digital filter 20B may have a transfer function to define a sinc response for 802.11b signals between approximately –9 to +9 MHz.

The additional filtering performed by digital filter 20B can ensure that IEEE 802.11b signals are distinguished from jammer signals. Accordingly, the filtered digital baseband signal that corresponds to IEEE 802.11b can be output by digital filter 20B and then sent to demodulation unit(s) 22B for demodulation. Again, a DVGA may also be implemented to scale the digital baseband signal prior to demodulation. Importantly, however, because digital filter 20B is enabled for IEEE 802.11b, digital filtering is performed on digital baseband signals that correspond to IEEE 802.11b.

FIG. 3C illustrates the same wireless device 10B illustrated in FIGS. 3A and 3B. In FIG. 3C, however, wireless device 10B is configured for communication according to the IEEE 802.11a wireless networking standard. In that case, control unit 24B configures wireless device 10B for communication according to the IEEE 802.11a standard by enabling second receiver 15B and disabling digital filter 20B. Again, this enabling may be performed in response to user input defining IEEE 802.11a as the communication mode, or alternatively, may be performed automatically upon identifying that an IEEE 802.11a signal has been received.

As illustrated in FIG. 3C, second receiver 15B may comprise a 5 GHz receiver coupled to antenna 13B. Like first receiver 14B, second receiver 15B may comprise a zero IF architecture, although this disclose is not limited in that respect. In a zero IF architecture, second receiver 15B scales a received IEEE 802.11a signal and downconverts the received IEEE 802.11a signal directly to baseband. At baseband, the IEEE 802.11a signal comprises an OFDM signal having channels that span a frequency band of approximately +9 MHz to −9 MHz. In particular, at baseband the IEEE 802.11a signal is substantially similar to an IEEE 802.11g signal.

Again, analog filter 16B may comprise a transconductance-capacitor (gmC) filter 16B having a passband that substantially conforms with the IEEE 802.11g standard. However, since IEEE 802.11a and IEEE 802.11g are substantially the same at baseband, the passband of analog filter 16B also substantially conforms with the IEEE 802.11a standard.

After filtering by analog filter 16B, the IEEE 802.11a analog baseband signal is sent to an A/D converter 18B, which may comprise a 10-bit A/D converter, a sigma-delta A/D converter, or the like. A/D converter 18B converts the IEEE 802.11a analog baseband signal to an IEEE 802.11a digital baseband signal and sends the digital baseband signal directly to demodulation unit(s) 22B for demodulation. As mentioned above, a DVGA may also be implemented to scale the digital baseband signal prior to demodulation. Importantly, however, because digital filter 20B is disabled, digital filtering of the IEEE 802.11a digital baseband signal is avoided.

FIGS. 3A–3C collectively illustrate one example of a wireless device configured to support a plurality of wireless protocols by selectively enabling different sets of components for the different protocols. Although FIGS. 3A–3C illustrate a specific embodiment in which IEEE 802.11g, IEEE 802.11b, and IEEE 802.11a are supported, the same principles may be extended for use with other wireless networking protocols or other wireless communication protocols. In any case, the architecture may support a plurality of protocols without requiring separate receivers and/or separate analog filters for every protocol.

Figure 4:
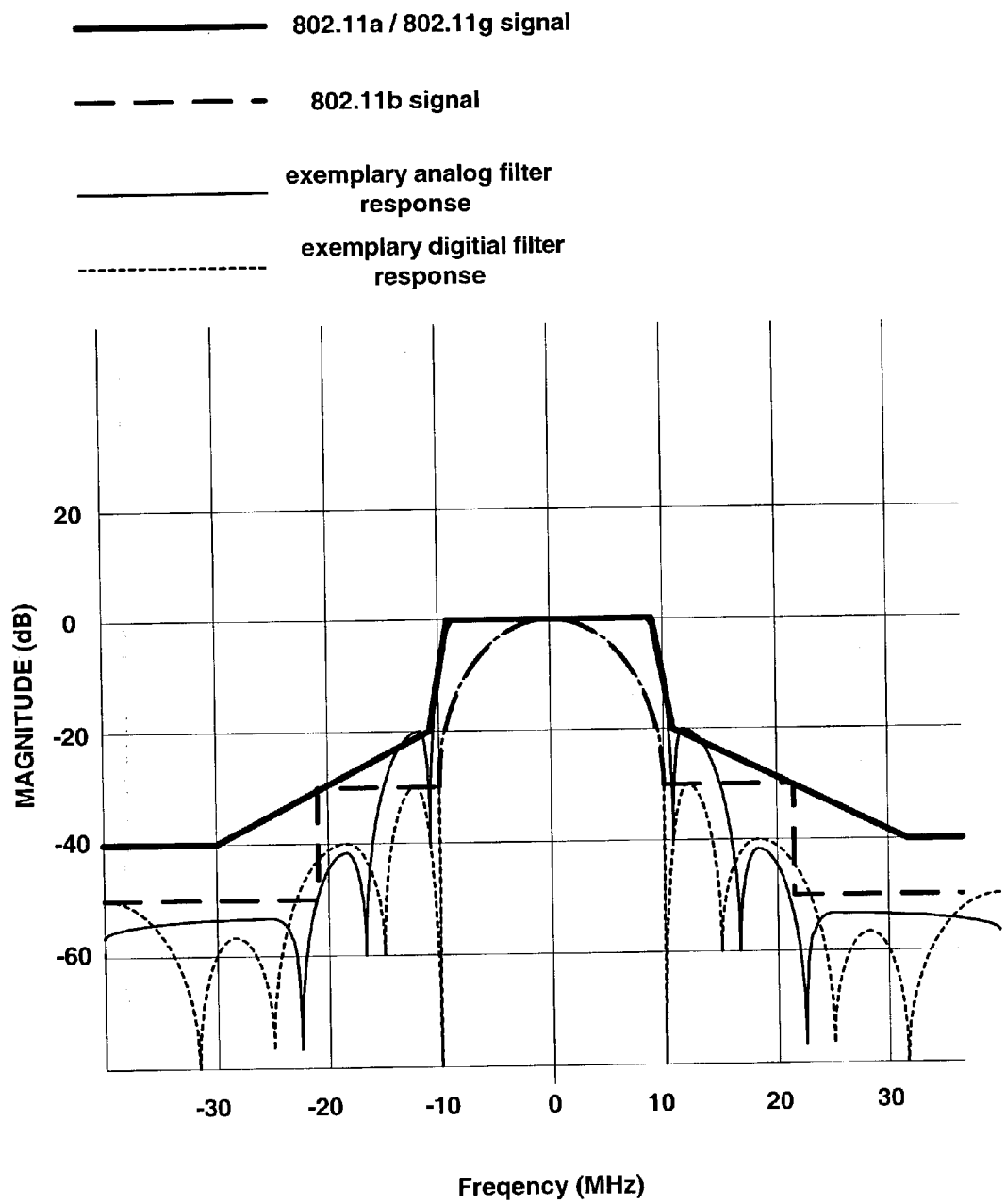
FIG. 4 is a graph illustrating exemplary transfer functions of analog and digital filters relative to different IEEE 802.11 baseband signals.

FIG. 4 is an exemplary graph of an IEEE 802.11b baseband signal relative to a baseband signal of either IEEE 802.11a or IEEE 802.11g. In addition, FIG. 4 illustrates an acceptable filter response for analog filter 16B, and an acceptable filter response for digital filter 20B. As shown in FIG. 4, the IEEE 802.11b signal falls within an IEEE 802.11a or an IEEE 802.11g signal, particularly between −9 MHz and 9 MHz. This allows a common analog filter 16B to be designed for effective filtering of IEEE 802.11a baseband signals or IEEE 802.11g signals, while still passing IEEE 802.11b signals. Accordingly, by designing a digital filter 20B with a transfer function substantially as illustrated in FIG. 4, a single analog filter with the illustrated transfer function can be used.

The exemplary transfer function of analog filter 16B illustrated in FIG. 4 may provide adequate filtering to substantially meet the IEEE 802.11a and IEEE 802.11g specifications. In addition, the exemplary transfer function of analog filter 16B illustrated in FIG. 4 may provide enough filtering for 802.11b to ensure adequate attenuation of jammer signals so that saturation of A/D converter 18B does not occur. The remaining filtering needed to substantially comply with the IEEE 802.11b specification can be performed by digital filter 20B, e.g., having an exemplary transfer function also illustrated in FIG. 4. By way of example, digital filter 20B may comprise a (1,1) digital filter, e.g., a finite impulse response filter with coefficients of (1,1).

Figure 5:
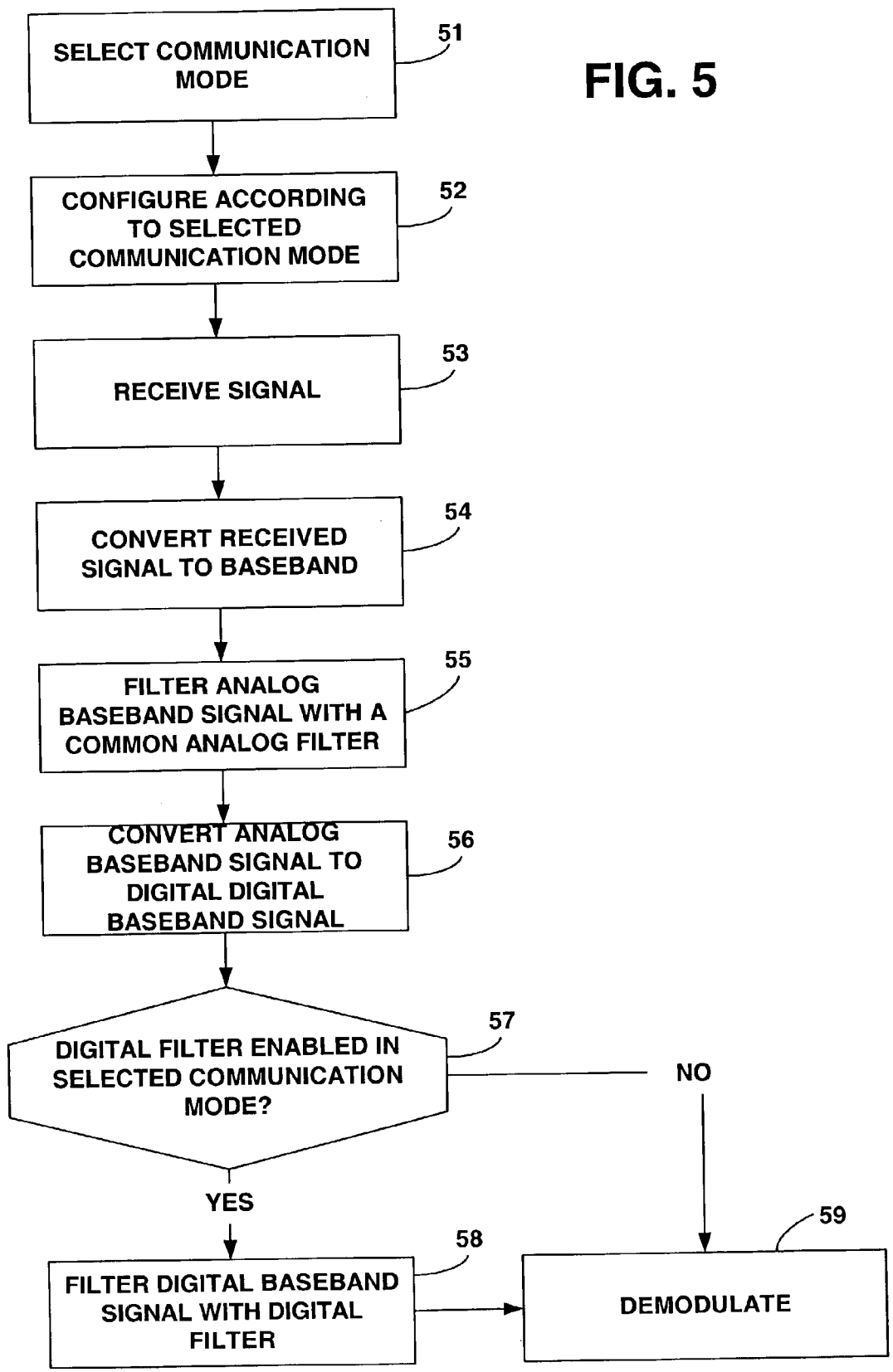
FIG. 5 is a flow diagram illustrating a signal processing technique that can be executed in a wireless device in accordance with an embodiment.

FIG. 5 is a flow diagram illustrating a signal processing technique that may be performed by a wireless device. FIG. 5 will be described using wireless device 10A of FIG. 2 as an exemplary device. A similar technique may also be performed with wireless device 10 of FIG. 1, wireless device 10B of FIGS. 3A–3C, or similar devices configured to operate according to the teaching of this disclosure.

As shown in FIG. 5, control unit 24A of wireless device 10A selects a communication mode (51). For example, control unit 24A may perform this selection in response to user input, or may automatically select a protocol based on measurements of a received signal. In either case, control unit 24A configures according to the selected communication mode (52), such as by selectively enabling one of receivers 14A, 15B, and either enabling or disabling digital filter 20A. If more digital filters are used, control unit 20A may selectively enable one or more digital filters consistent with the selected protocol. In any case, after control unit 24A has configured wireless device 10A for the selected communication mode, wireless device 10A can receive and process wireless signals modulated according to that selected communication mode.

Upon receiving a signal (53), a selected receiver 14A or 14B converts the received signal to baseband (54). Analog filter 16A filters the analog baseband signal (55), and A/D converter 18A converts the analog baseband signal to a digital baseband signal (56). At that point, the digital baseband signal is either demodulated, or further filtered by digital filter 20A. Digital variable gain amplification, or other signal conditioning may also occur prior to demodulation regardless of whether or not the additional digital filtering is performed.

Digital filtering may only occur if one or more digital filters 20A are enabled in the selected communication mode (57). For example, if control unit 24A enabled digital filter 20A consistent with a protocol (yes branch of 57), then digital filter 20A filters the digital baseband signal (58) prior to demodulation (59). If, on the other hand, control unit 24A disabled digital filter 20A consistent with a protocol (no branch of 57), then demodulation occurs (59) without such digital filtering.

Various techniques for efficient implementation of a plurality of wireless protocols in a wireless device have been described. Example hardware implementations may include implementations within a DSP, an application specific integrated circuit (ASIC), a field programmable gate array (FPGA), a programmable logic device, specifically designed hardware components, or any combination thereof. In addition, one or more of the techniques described herein may be partially or wholly executed in software. In that case, a computer readable medium may store computer readable instructions that can be executed by a processor to carry out one of more of the techniques described above. For example, control unit 24, 24A, 24B may include a computer-readable medium suitable for storing instructions, including random access memory (RAM), read-only memory (ROM), non-volatile random access memory (NVRAM), electrically erasable programmable read-only memory (EEPROM), flash memory, and the like. In that case, control unit 24, 24A, 24B may also include a processor or DSP that executes the stored instructions to perform the techniques described herein.

In addition, other modifications may also be made without departing from the spirit and scope this disclosure. For example, similar techniques may also be implemented in wireless communication devices to process signals modulated according to CDMA techniques, TDMA techniques, FDMA techniques, combinations of techniques, or the like. Also, standards that comply with the Bluetooth Special Interest Group may be supported using common components as outlined above. In some cases, one or more sets of digital filters may be implemented for any given protocol so that a common analog filter can be used.

Also, it is understood that wireless devices, as described herein may correspond to computing devices, or network access points that facilitate wireless network access to the computing devices. In other words, the filtering techniques may be performed by a wireless computing device that communicates with a wireless access points, and may also be performed by the wireless access point that communicates with the wireless computing device. In other words, in a wireless network environment, the term wireless device refers to either a wireless computing device or a wireless access point. Also, as mentioned above, a wireless device may also refer to wireless communication devices, e.g., commonly used in voice communication, other types wireless devices. Accordingly, these and other embodiments are within the scope of the following claims.

The invention claimed is:

1. A method comprising:
    filtering a first analog signal with an analog filter, the first analog signal being modulated according to a first wireless protocol;
    converting the first analog signal to a first digital signal;
    demodulating the first digital signal;
    filtering a second analog signal with the analog filter, the second analog signal being modulated according to a second wireless protocol;
    converting the second analog signal to a second digital signal;
    filtering the second digital signal with a digital filter;
    demodulating the second digital signal;
    receiving user input selecting the first wireless protocol and disabling the digital filter when the first protocol is selected; and
    receiving user input selecting the second wireless protocol and enabling the digital filter when the second protocol is selected.

2. The method of claim 1, wherein the analog filter filters the first analog signal to condition the first analog signal for subsequent demodulation of the first digital signal according to the first wireless protocol, wherein the analog filter filters the second analog signal to partially condition the second analog signal, and wherein the digital filter filters the second digital signal to condition the second digital signal for demodulation according to the second wireless protocol.

3. The method of claim 1, wherein the first wireless protocol is selected from the group consisting of: an IEEE 802.11a protocol and an IEEE 802.11g protocol; and
    wherein the second wireless protocol comprises an IEEE 802.11b protocol.

4. A method of supporting multiple protocols in a wireless device comprising:
    receiving first and second wireless signals at a first receiver, the first and second wireless signals being modulated and transmitted according to first and second wireless protocols respectively;
    receiving a third wireless signal at a second receiver, the third wireless signal being modulated and transmitted according to a third wireless protocol;
    converting the first, second, and third wireless signals to first, second, and third baseband signals respectively;
    filtering the first, second, and third baseband signals using a common analog filter;
    converting the first, second, and third baseband signals to first, second, and third digital baseband signals respectively;
    filtering the second digital baseband signal using a digital filter;
    not filtering the first and third digital baseband signals using the digital filter; and
    demodulating the first, second, and third digital baseband signals.

5. The method of claim 4, further comprising:
    configuring the wireless device for the first wireless protocol by enabling the first receiver, disabling the second receiver, and disabling the digital filter;
    configuring the wireless device for the second wireless protocol by enabling the first receiver, disabling the second receiver, and enabling the digital filter; and
    configuring the wireless device for the third wireless protocol by enabling the second receiver, disabling the first receiver, and disabling the digital filter.

6. The method of claim 4, wherein the first wireless protocol comprises an IEEE 802.11g protocol, the second wireless protocol comprises an IEEE 802.11b protocol, and the third protocol comprises an IEEE 802.11 a protocol.

7. An apparatus comprising:
    an analog filter to filter signals associated with a plurality of wireless protocols;
    a digital filter to selectively filter some of the signals based on a respective wireless protocol associated with a signal;
    a control unit to enable or disable the digital filter based on the respective wireless protocol,
    wherein the control unit receives user input specifying one wireless protocol, and enables the digital filter in response to the user input.

8. The apparatus of claim 7, wherein the control unit receives user input specifying one wireless protocol, and disables the digital filter in response to the user input.

9. The apparatus of claim 7, wherein the analog filter is a transconductance-capacitor (gmC) filter, and wherein the digital filter is clocked at a rate corresponding to a size of a desired pass band for one of the plurality of wireless protocols.

10. A wireless device comprising:
    one or more receivers to receive different wireless signals modulated according to a plurality of different wireless protocols;
    an analog filter to filter analog signals associated with the different wireless signals;

an analog-to-digital converter to convert the analog signals to digital signals;

a digital filter to selectively filter some of the digital signals generated from the analog signals based on the wireless protocols associated with respective signals;

one or more demodulators to demodulate the digital signals; and a control unit to configure the wireless device to selectively filter digital signals wherein the control unit receives user input specifying the selected wireless protocol, and enables the digital filter in response to the user input.

11. The wireless device of claim 10, wherein the control unit enables or disables the digital filter based on a selected wireless protocol.

12. The wireless device of claim 11, wherein the control unit receives the user input specifying the selected wireless protocol, and disables the digital filter in response to the user input.

13. The wireless device of claim 10, wherein the analog filter is a transconductance-capacitor (gmC) filter, and wherein the digital filter is clocked at a rate corresponding to a size of a desired pass band for one of the plurality of wireless protocols.

14. A wireless device comprising:
a first receiver to receive first and second wireless signals and to convert the first and second wireless signals to first and second analog baseband signals respectively, the first and second analog baseband signals being modulated according to first and second wireless protocols respectively;
a second receiver to receive a third wireless signal and to convert the third wireless signal to a third analog baseband signal, the third analog baseband signal being modulated according to a third wireless protocol;
an analog filter to filter the first, second, and third analog baseband signals:
an analog-to-digital converter to convert the first, second, and third analog baseband signals to first, second, and third digital baseband signals respectively;
a digital filter to selectively filter the second digital baseband signal but not filter the first and third digital baseband signals; and
one or more demodulators to demodulate the first, second, and third digital baseband signals.

15. The wireless device of claim 14, further comprising a control unit to:
configure the wireless device for the first wireless protocol by enabling the first receiver, disabling the second receiver, and disabling the digital filter;
configure the wireless device for the second wireless protocol by enabling the first receiver, disabling the second receiver, and enabling the digital filter; and
configure the wireless device for the third wireless protocol by enabling the second receiver, disabling the first receiver, and disabling the digital filter.

16. The wireless device of claim 15, wherein the control unit receives user input specifying one wireless protocol, and configures the wireless device consistent with the one wireless protocol.

17. A computer readable medium comprising machine readable instructions that when executed in a wireless device that includes a common analog filter to filter analog signals and a digital filter to filter digital signals associated with some analog signals:

disables the digital filter for a first wireless protocol; and
enables the digital filter for a second wireless protocol,
wherein the instructions when executed receive user input specifying a user selected wireless protocol, disable the digital filter if the user selected wireless protocol corresponds to the first wireless protocol and enable the digital filter if the user selected wireless protocol corresponds to the second wireless protocol.

18. The computer readable medium of claim 17, wherein the medium comprises memory that stores the machine readable instructions for execution by a control unit of the wireless device.

19. A method comprising:
receiving first and second wireless signals respectively conforming to first and second wireless protocols;
mixing the first and second wireless signals to first and second analog baseband signals;
filtering the first and second analog baseband signals with an analog filter;
converting the first and second analog baseband signals to first and second digital baseband signals;
demodulating the first digital baseband signal;
filtering the second digital baseband signal using a digital filter;
demodulating the second digital baseband signal;
receiving user input selecting the first wireless protocol and disabling the digital filter when the first protocol is selected; and
receiving user input selecting the first wireless protocol and enabling the digital filter with the second protocol is selected.

20. The method of claim 19, further comprising:
receiving user input selecting the first wireless protocol and disabling the digital filter when the first protocol is selected; and
receiving user input selecting the first wireless protocol and enabling the digital filter with the second protocol is selected.

21. An apparatus comprising:
means for filtering a first analog signal with an analog filter, the first analog signal being modulated according to a first wireless protocol;
means for converting the first analog signal to a first digital signal;
means for demodulating the first digital signal;
means for filtering a second analog signal with the analog filter, the second analog signal being modulated according to a second wireless protocol;
means for converting the second analog signal to a second digital signal;
means for filtering the second digital signal with a digital filter;
means for demodulating the second digital signal;
means for receiving user input selecting the first wireless protocol and disabling the digital filter when the first protocol is selected; and
means for receiving user input selecting the second wireless protocol and enabling the digital filter when the second protocol is selected.

* * * * *